No. 818,584. PATENTED APR. 24, 1906.
E. W. TREATT.
LOCK NUT.
APPLICATION FILED SEPT. 13, 1905.
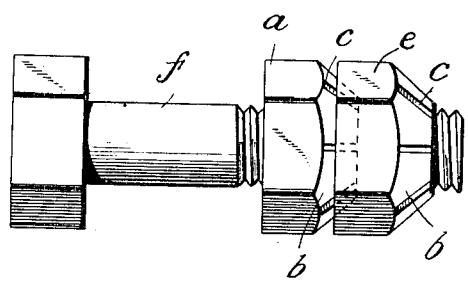
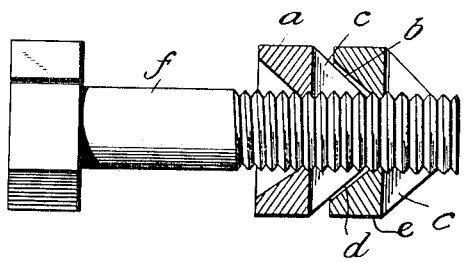
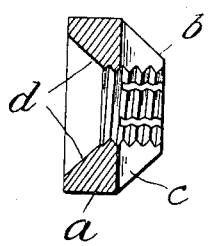
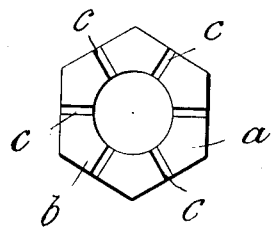

UNITED STATES PATENT OFFICE.

ETHELRED WALTER TREATT, OF PLAISTOW, ENGLAND.

LOCK-NUT.

No. 818,584.　　　Specification of Letters Patent.　　　Patented April 24, 1906.

Application filed September 13, 1905. Serial No. 278,332.

*To all whom it may concern:*

Be it known that I, ETHELRED WALTER TREATT, a subject of the King of Great Britain, residing at Plaistow, England, have invented certain new and useful Improvements in Lock-Nuts, of which the following is a specification.

This invention relates to new and useful improvements in lock-nuts; and it consists of two parts, a lower and an upper nut, acting one in conjunction with the other and so constructed that they may be interchangeable—that is, the upper nut may be used as the lower nut, and vice versa.

The purpose of the invention is accomplished by making the faces of the nuts concaved and convexed, the convexed portions of the nut being slotted.

It is a further object of this invention to produce a device of the character noted which will possess advantages in points of simplicity, efficiency, and durability, proving at the same time comparatively inexpensive to manufacture.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters indicate corresponding parts in the several views, in which—

Figure 1 is a view in elevation of a bolt with the lock-nuts applied thereto. Fig. 2 is a view similar to Fig. 1, except the lock-nuts are shown in section. Fig. 3 is a sectional view of a nut unapplied. Fig. 4 is a top plan view of a nut.

In the drawings, $a$ $e$ indicate the nuts which are adapted to be threaded on the bolt $f$. As both of the nuts are of the same construction, a description of but one will be given. The under surface of the nut is concaved, as at $d$, while the upper surface is convexed or cone-shaped. The convexed or cone-shaped portion is provided with a series of radial slots $c$, which permit the compression of the cone or convexed portion.

In practice the nuts $a$ and $e$ are threaded on the bolt $f$, and the convexed portion $b$ of the lower nut $a$ is engaged by the concaved portion $d$ of the nut $e$. As the nut $e$ is turned down on the nut $a$ the convexed or cone portion is compressed, which binds said nut into the bolt.

Having fully described my invention, what I claim as new, and desire to secure by Letters Patent, is—

1. In combination with a bolt, a series of nuts adapted to engage said bolt, said nuts acting in conjunction one with the other, said nuts having concaved and convexed faces, the convexed faces being slotted radially and fitting with a concaved face.

2. In combination with a bolt, a pair of nuts adapted to engage said bolt, said nuts acting in conjunction one within the other, said nuts having their under surfaces concaved and their upper surfaces conical and slotted, the conical surface being adapted to engage the concaved surface.

In witness whereof I have hereunto set my hand in presence of two witnesses.

ETHELRED WALTER TREATT.

Witnesses:
　W. J. NORWOOD,
　WALTER J. SKERTEN.